(12) United States Patent
Anderson

(10) Patent No.: US 11,199,237 B2
(45) Date of Patent: Dec. 14, 2021

(54) INTERNAL BYPASS SHOCK ABSORBER

(71) Applicant: Raptor Performance Shocks, LLC, Warroad, MN (US)

(72) Inventor: Jake R. Anderson, Warroad, MN (US)

(73) Assignee: Raptor Performance Shocks, LLC, Warroad, MN (US)

( * ) Notice: Subject to any disclaimer, the term of this patent is extended or adjusted under 35 U.S.C. 154(b) by 95 days.

(21) Appl. No.: 16/535,832

(22) Filed: Aug. 8, 2019

(65) Prior Publication Data

US 2020/0049221 A1 Feb. 13, 2020

Related U.S. Application Data

(60) Provisional application No. 62/715,836, filed on Aug. 8, 2018.

(51) Int. Cl.

| | |
|---|---|
| *F16F 9/48* | (2006.01) |
| *F16F 9/346* | (2006.01) |
| *F16F 9/32* | (2006.01) |
| *F16F 13/00* | (2006.01) |
| *F16F 9/36* | (2006.01) |
| *B60G 15/06* | (2006.01) |
| *F16F 9/02* | (2006.01) |
| *F16F 9/19* | (2006.01) |

(52) U.S. Cl.
CPC .......... *F16F 9/3465* (2013.01); *B60G 15/062* (2013.01); *F16F 9/0218* (2013.01); *F16F 9/0281* (2013.01); *F16F 9/19* (2013.01); *F16F 9/3235* (2013.01); *F16F 9/3271* (2013.01); *F16F 9/368* (2013.01); *F16F 9/48* (2013.01); *F16F 13/007* (2013.01); *B60G 2202/24* (2013.01); *B60G 2202/242* (2013.01); *B60G 2202/312* (2013.01); *B60G 2206/41* (2013.01); *B60G 2206/80* (2013.01); *B60G 2500/10* (2013.01); *B60G 2800/162* (2013.01); *F16F 2226/04* (2013.01); *F16F 2228/066* (2013.01)

(58) Field of Classification Search
CPC ...... F16F 9/34; F16F 9/48; F16F 9/346; F16F 9/537
USPC ................................. 188/285, 287; 267/221
See application file for complete search history.

(56) References Cited

U.S. PATENT DOCUMENTS

| | | | | |
|---|---|---|---|---|
| 2,417,096 A | * | 3/1947 | Thiry ................... | F16F 13/262 267/140.11 |
| 4,071,122 A | * | 1/1978 | Schupner ................. | F16F 9/44 188/285 |

(Continued)

*Primary Examiner* — Christopher P Schwartz
(74) *Attorney, Agent, or Firm* — Fogg & Powers LLC

(57) ABSTRACT

A shock absorber is provided that includes a shock body and a shaft assembly. The shock body has an inner chamber. The inner chamber is defined by a cylindrical interior surface. At least one groove is formed in the interior surface within at least one select length of the shock body. A piston of the shaft assembly is received within the inner chamber of the shock body. The piston includes valving to allow dampening matter that is received within the inner chamber to pass through the piston to allow the piston to move within the inner chamber. The at least one groove that is formed within the interior surface is configured to allow at least some of the dampening matter to bypass the valving of the piston to allow the piston to move through the at least one select length with less resistance.

20 Claims, 11 Drawing Sheets

(56) References Cited

U.S. PATENT DOCUMENTS

| | | | |
|---|---|---|---|
| 4,166,522 A * | 9/1979 | Bourcier de Carbon | F16F 9/346 188/287 |
| 4,298,101 A * | 11/1981 | Dressell, Jr. | F16F 9/48 188/285 |
| 5,535,862 A * | 7/1996 | Jentsch | F16F 9/585 188/284 |
| 5,598,904 A * | 2/1997 | Spyche, Jr. | F16F 9/34 188/287 |
| 6,296,092 B1 | 10/2001 | Marking et al. | |
| 6,415,895 B2 | 7/2002 | Marking et al. | |
| 6,966,412 B2 | 11/2005 | Braswell et al. | |
| 7,320,388 B2 * | 1/2008 | de Molina | F16F 9/34 188/281 |
| 9,133,902 B2 * | 9/2015 | Spyche, Jr. | F16F 9/346 |
| 9,605,726 B2 * | 3/2017 | Baldoni | B60G 15/062 |
| 10,823,249 B2 * | 11/2020 | Sawai | F16F 9/065 |
| 2006/0180966 A1 * | 8/2006 | Miyashiro | B60G 13/005 267/221 |
| 2009/0294231 A1 * | 12/2009 | Carlson | F16F 9/537 188/267.2 |
| 2010/0109277 A1 * | 5/2010 | Furrer | F16F 9/061 280/124.161 |
| 2021/0039740 A1 * | 2/2021 | Fellner | F16F 9/067 |

\* cited by examiner

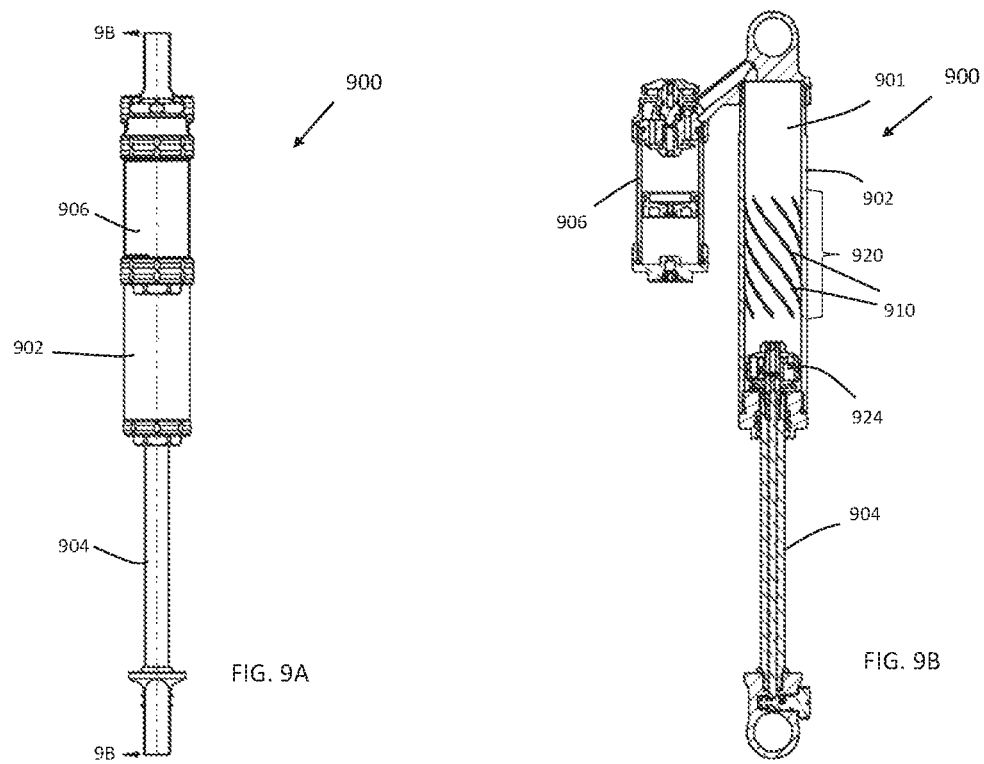

INTERNAL BYPASS SHOCK ABSORBER

CROSS-REFERENCE TO RELATED APPLICATIONS

This application claims priority to U.S. Provisional Application Ser. No. 62/715,836, same title herewith, filed on Aug. 8, 2018, which is incorporated in its entirety herein by reference.

BACKGROUND

Shock absorbers are used to provide improved ride quality and vehicle handling as a vehicle travels over uneven terrain. A common shock absorber is designed to limit excessive suspension movement by dampening spring oscillations of an associated spring. A typical method used to dampen spring oscillations is with the use of valves to selectively pass oil and/or gasses in a chamber to absorb excess energy of the springs. For off road type vehicles such as all-terrain vehicles (ATVs), side-by-side vehicles, utility vehicles, 4×4 vehicles, etc. the ability for the shock absorber to handled extreme terrain so the vehicle does not bottom out is important. Bottoming out occurs when an end of the vehicle suspension of travel is reached. However, a shock absorber designed to prevent bottoming out does not typically perform well when the vehicle is traversing across terrain that is less extreme. This is especially true when the terrain includes smaller bumps that when traveled across at speed cause chatter (a rapid up and down movement). Likewise a shock absorber that is designed to be more compliant to address chatter type bumps is less likely to fair well when encountering extreme bumps which may lead to the bottoming out of the suspension of the vehicle.

SUMMARY

The following summary is made by way of example and not by way of limitation. It is merely provided to aid the reader in understanding some of the aspects of the subject matter described. Embodiments provide a shock absorber design that provides desired ride quality and vehicle handling across different types of terrain. Embodiments accomplish this with use of multiple operational zones. Each operational zone provides a different operational characteristic for the shock absorber so the shock absorber performs well across different operational conditions such as, but not limited to, operation conditions experienced by chatter type bumps as well as extreme bumps.

In one embodiment, a shock absorber is provided that includes a shock body and a shaft assembly. The shock body has an inner chamber. The inner chamber is defined by a cylindrical interior surface of the shock body. At least one groove is formed in the interior surface of the shock body within at least one select length of the shock body. A piston of the shaft assembly is received within the inner chamber of the shock body. The piston includes valving to allow dampening matter that is received within the inner chamber to pass through the piston to allow the piston to move within the inner chamber of the main shock body. The at least one groove that is formed within the interior surface is configured to allow at least some of the dampening matter to bypass the valving of the piston to move the piston through the at least one select length of the main shock body including the at least one groove with less resistance with less resistance than is encountered with the dampening matter only flowing through the valving.

In another example embodiment, another shock absorber is provided that includes a shock body and a shaft assembly. The shock body has an internal chamber. The internal chamber is defined by a cylindrical interior surface. The shock body includes a plurality of operational zones. Each operational zone covers a select length of the interior surface of the shock body. At least one operational zone of the plurality of operational zones has a plurality of grooves formed in the interior surface of the shock body. At least one other operational zone of the plurality of operational zones does not have a groove formed in the interior surface of the shock body. The shaft assembly includes a piston. The piston is received within the internal chamber of the shock body. The piston includes valving that allows dampening matter that is received within the internal chamber to pass through the piston as the piston moves within the internal chamber. The plurality of grooves in the at least one operational zone allows the dampening matter to at least in part bypass the valving of the piston as the piston of the shaft assembly passes through the at least one operational zone with the plurality of grooves.

In yet another embodiment, a method of forming a shock absorber is provided. The method includes; dividing a length of a shock body into a plurality of operational zones; forming a plurality of grooves in a cylindrical interior surface that defines an internal chamber of the shock body in one of the operational zones; positioning a piston including shaft assembly within the internal chamber, the piston including valving; and placing dampening matter within the internal chamber, wherein movement of the piston within the internal chamber within a zone without the at least one groove causes the dampening matter to pass through the valving in the piston while movement of the piston within the internal chamber through the operational zone with the at least one groove allows the dampening matter to at least in part bypass the valving in the piston.

BRIEF DESCRIPTION OF THE DRAWINGS

Embodiments can be more easily understood and further advantages and uses thereof will be more readily apparent, when considered in view of the detailed description and the following figures in which:

FIG. 9A is a side view of a rebound adjust, reservoir, non-coilover shock absorber according to one exemplary embodiment;

FIG. 9B is a cross-sectional side view of the shock absorber along line 9B_9B of FIG. 9A.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide an internal bypass shock absorber with a plurality of different operational zones. Each operational zone dictates the operational characteristics of the shock absorber while the shock absorber is operating within the zone. This is done by varying a dampening fluid resistance across operational zones in both compression and rebound strokes. In an embodiment, at least one operational zone is a bypass dampening zone or ride zone that creates a pre-set fluid dampening variance from other operating zones. In this zone, the design of shock absorber allows for dampening fluid to bypass valving in a piston of the shock absorber via grooves in a single wall shock body. The bypass of dampening fluid allows for a compliant feel in the bypass dampening zone of the shock absorber. By implementing different operational zones, embodiments of the shock absorber are able to provide a compliant ride while traveling across smaller chatter type bumps and still provide a shock that has good bottom out protection when traversing over large bumps. This is accomplished in embodiments without requiring the operator of the vehicle to make any adjustments to the shocks of the vehicle. Although, embodiments are described below as be implemented with a dampening fluid, other matter such as a dampening gas may also be used.

Figure 1:
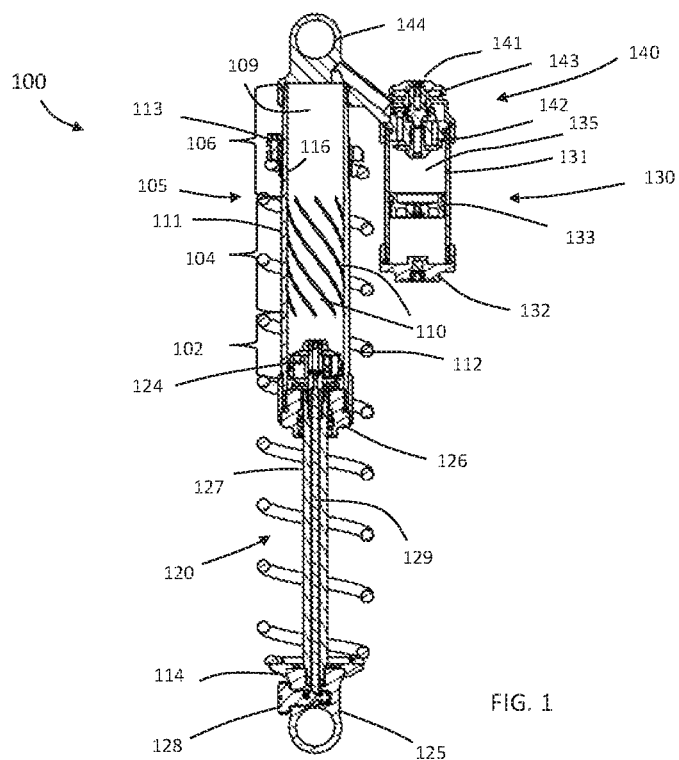
FIG. 1 illustrates a cross-sectional side view of a shock absorber according to one exemplary embodiment.

An example embodiment of a shock absorber 100 is illustrated in FIG. 1. The shock absorber 100 includes a body assembly 105, a shaft assembly 120, a body cap assembly 140, a reservoir assembly 130 and a compression spring 112.

The body assembly 105 includes a main shock body 111 (or shock body 111) which, in this example embodiment, is a single wall cylinder. A body cap 144 is threadably coupled to one end of the main shock body 111. A seal is used with the body cap 144 to prevent fluid leakage. A bearing cap 126 is threadably received in the other end of the shock body 111. The bearing cap 126 includes at least one seal to prevent fluid leakage between the bearing cap 126 and a main shaft 127 of the shaft assembly 120. In this example embodiment that includes an integrated compression spring 112, the outside of the main shock body 111 includes features to accommodate the spring 112 such as spring adjuster 113. Also, the shaft assembly 120 includes a spring retainer 114 to engage the other end of the compression spring 112. In other embodiments that do not no include a compression spring or embodiments in which a compression spring is not positioned around the shock absorber, the spring adjuster and spring retainer features are not used.

The reservoir assembly 130 in this example embodiment includes a reservoir body 131 that provides a reservoir for the fluid used by the shock absorber 100 to absorb energy. A reservoir cap 132 is threadably coupled to one end of the reservoir body 131. Within the reservoir body 131 is an internal floating piston 133. The internal floating piston 133 is sealed to the reservoir body 131 and separates shock absorber hydraulic fluid from the gas charge.

The body cap assembly 140 is threadably engaged with another end of the reservoir body 131. The body cap assembly 140 provides an interface for the fluid between a main inner chamber 109 (inner chamber 109) of the main shock body 111 (shock body 111) and a reservoir inner chamber 135 of the reservoir body 131. The body cap assembly 140 includes the body cap 144 that is threadably coupled to the first end of the shock body 111. The body cap 144 allows fluid flow from the shock body 111 to the reservoir body 131. This flow is metered by actuation of the compression adjuster knob 141 which rotates the compression adjuster needle 143 inside the compression head assembly 142 which is secured and sealed between the reservoir body 131 and body cap 144. The body cap 144 further includes an eyelet used to couple the shock absorber 100 to a suspension component of a vehicle.

On a compression adjustable shock, the purpose of the body cap assembly 140 is to allow securing of the shock body 111 and reservoir body 131 and to provide a fluid passage to transfer dampening fluid between the shock body 111 and reservoir body 131. As discussed above, the body cap 144 serves as a main mounting point for the shock absorber 100 into a given suspension system. On a compression adjustable shock absorber, the body cap 144 houses the compression adjuster knob 141 and adjuster needle 143 to meter the fluid flow between the shock body 111 and the reservoir body 131.

The body cap assembly 140 may be configured for a non-reservoir style shock absorber, sometimes referred to as a monotube shock absorber. The body cap assembly 140 may also be configured for a remote reservoir attachment.

As discussed above, the reservoir assembly 130 allows additional fluid volume for the shock absorber to dissipate heat. During a compressive event, the piston 124 of the shaft assembly 120 will pass though the dampening fluid in the inner chamber 109 of the shock body 111. The added volume of the main shaft 127 of the shaft assembly 120, forces excess fluid into the reservoir assembly 130 through the body cap 144 and compression head assembly 142. The compression head assembly 142 is positioned between the reservoir 135 and body cap 144 to allow the end user to meter fluid flow via the compression needle 143 and compression adjustment knob 141 on a compression adjustable shock absorber 100. The reservoir assembly 130 houses the internal floating piston 133. As discussed above, the purpose of that internal floating piston 133 is to separate the dampening fluid from the gas charge within the reservoir body. The reservoir assembly 130 may have reservoir bodies of varying size and lengths to increase or decrease fluid volume for a given application. The reservoir assembly 130 may also be attached remotely if necessary for a given suspension application.

The shaft assembly 120 includes a rebound adjustment inner needle 129 that is positioned within the main shaft 127 and a rebound adjustment knob 128 to selectively manipulate the rebound adjustment inner needle 129. The shaft assembly 120 in this example also includes a shaft mounting eyelet 125 which is secured to the main shaft 127. The shaft mounting eyelet 125 is used to couple the shaft assembly 102 to a suspension component of the vehicle. The bearing cap 126, discussed above, encompasses the main shaft 127 via bearing surface and the piston 124 and valving for both rebound and compression sides of the piston 124 are secured to the shaft 127. The anti-pack valve 123 is incorporated into the piston 124 and is present to control internal fluid flow in a given direction with a check ball 117 in an embodiment.

Figure 2A:
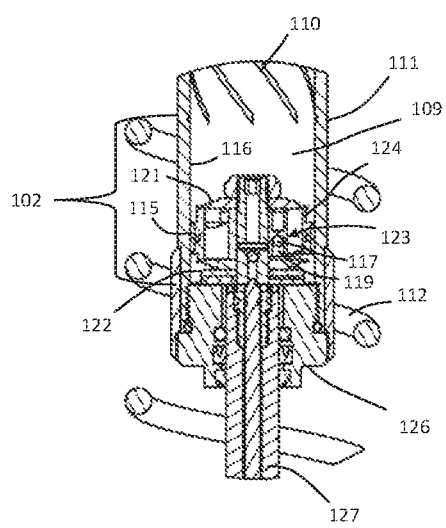
FIG. 2A illustrates a partial close up cross-sectional side view of a top out zone of the shock absorber of FIG. 1.

As best illustrated in FIG. 2A, the shaft assembly 120, in this example embodiment, further includes a main piston 124 (or piston 124) that is received within the inner chamber 109 of the main shock body 111. The piston 124 includes a compression valve stack 122 and a rebound valve stack 121. The piston 124 also includes a piston band 115 that engages a cylindrical interior surface 116 (sidewall) of the inner chamber 109 of the main shock body 111. Other types of engagement between the piston 124 and the interior surface 116 may be used.

The piston 124 also includes valving that allows dampening fluid to pass through the piston 124 at a select rate to allow the piston 124 to move in the inner chamber 109 during events of shock absorber compression and extension to achieve a desired characteristic of the shock absorber 100. The valving may include at least one anti-pack valve 123. The anti-pack valve 123 in this example includes a check valve with a ball 117 that is received within a fluid passage 119. The ball 117 selectively seats within the fluid passage 119 to separate the rate of flow control between rebound and compression strokes. Other types of valving may be used. The rebound adjustment knob 128 is used to actuate the rebound adjustment inner needle 129 in a shock absorber with rebound adjustment as discussed above.

In some embodiments, the rate at which the piston 124 of the shaft assembly 120 passes through dampening fluid is controlled by valving of the compression valve stack 122 as well as the valving of the rebound valve stack 121. The anti-pack valve 123, including the check ball 117 within a passage 199 of the piston 124, allows for independent flow characteristics of the compression valve stack 122 and rebound valve stack 121 in these embodiments.

Variations in both the compression and rebound valve stacks 122 and 121 are pre-calibrated for optimum fluid flow and thus ride quality for a given suspension application. Variations in the dimensional size and flow characteristics of the anti-pack valve 123 may also be necessary given a particular desired fluid flow characteristic for optimum ride quality. Variations in main shaft length 127, eyelet 125 length and rebound adjustment features are all pre-calibrated for optimum ride quality and functionality for a given suspension application.

Embodiments include operational zones. At least one operational zone includes internal grooves 100 formed into the interior surface 116 of the inner chamber 109 of the main shock body 111. The interior grooves 110 in the interior surface 116 allow fluid to pass between a side of the piston 124 and the interior surface 116 of the inner chamber 109 an bypass the valving in the piston 124. In the example illustrated in FIG. 2A, the grooves allow fluid between the piston band 115 of the piston 124 and the interior surface 116 of the inner chamber 109. Hence, within a zone with internal grooves, fluid may not only pass through the at least one anti-pack valve 123 of the piston 124 but also along the side of the piston 124 within the grooves. Further in some embodiments, the fluid totally bypasses the valving of the piston 124 with the grooves as the piston 124 moves in the inner chamber 109. Within this by-pass operational zone, less restriction to fluid flow is accomplished. Accordingly, the compliance of the shock absorber 100 is changed as the piston 124 passes through different zones as further described below.

FIG. 1 further illustrates three different zones 102, 104 and 106. In this example a first zone 102 may be referred to as a top out zone 102. In this zone, the interior surface 116 of the inner chamber 109 does not include interior grooves. Hence, when the piston 124 of the shock absorber 100 is within this zone (as shown in FIG. 1), fluid may only pass through the at least one anti-pack valve 123 providing a more restrictive flow of the dampening fluid. This provides more resistance to the movement of the piston 124 of the shaft assembly 120 in the inner chamber 109 resulting in higher absorption of energy and a desired characteristic of the shock absorber 100 when an associated vehicle encounters extreme terrain.

The bypass dampening zone 104 is located in what would be considered the main ride zone 104 of the shock absorber 100 in this example embodiment. The bypass dampening zone 104 includes grooves 100 that, as described above, allows at least some of the fluid to bypass the valving that includes the anti-pack value 123 therein providing less resistance to the movement of the piston 124 of the shaft assembly 120 in the inner chamber 109. Hence, in the bypass dampening zone, there is less restriction to fluid flow and less absorption of energy.

When the piston 124 of the shock absorber 100 is within a second or bottom out zone 106, fluid again may only pass through the at least one anti-pack valve 123 therein providing the desired characteristic of the shock absorber 100 when an associated vehicle encounters extreme terrain. The configuration with different zones 102, 104 and 106 allows a more compliant ride while the piston 124 is in the main ride zone 104 while still maintaining the desired characteristics when the piston 124 in the top out zone 102 and bottom out zone 106 (i.e. an increased resistance to fluid flow) to deal with extreme terrain. In particular, the grooves 100 (or channels) in the bypass dampening zone 104 allows the fluid to flow around the piston 124 so the characteristic of the shock absorber 100 when the piston 124 of the shaft assembly 120 is in the bypass dampening zone 104 is very soft. Once the piston 124 gets past the bypass dampening zone 104 and into either zone 102 or 106, all of the dampening fluid is forced through the valving 123 which makes the characteristic of the shock absorber 100 extremely stiff. Hence, with embodiments, the characteristic of the shock absorber are changed based on which operational zone the piston 124 of the shaft assembly 120 is passing through.

Figure 2B:
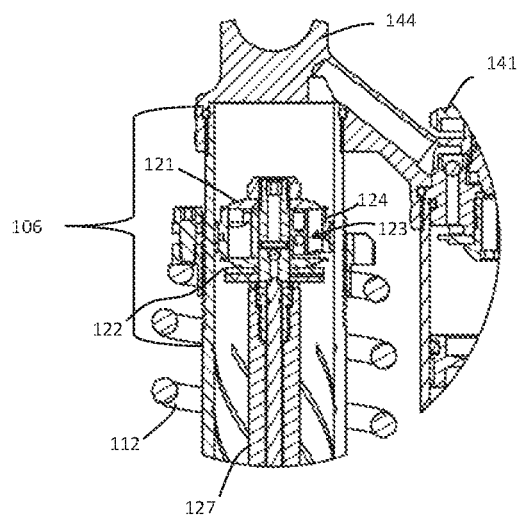
FIG. 2B illustrates a partial close up cross-sectional side view of a bottom out zone of the shock absorber of FIG. 1.
Figure 2C:
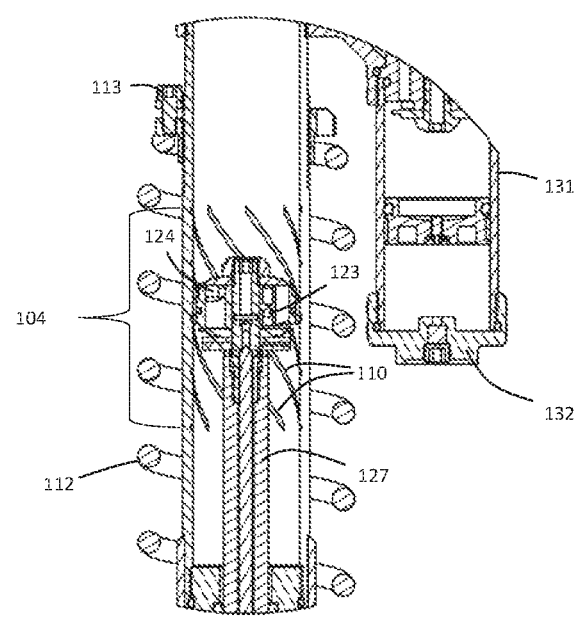
FIG. 2C illustrates a partial close up cross-sectional side view of bypass dampening zone of the shock absorber of FIG. 1.

FIG. 2A illustrates a close up view of the piston 124 in the top out operational zone 102 of the main shock body 111. This would occur when the shock absorber 100 is in a rebound position during exposure to extreme terrain. FIG. 2B illustrates a close up view of the piston 124 in the bottom out zone 106 of the main shock body 111. This would occur when the shock absorber 100 is in a compression position during exposure to extreme terrain. FIG. 2C illustrates a close up view of the piston 124 in the main ride zone 104 of the main shock body 111. This would occur when the shock absorber 100 is exposed to normal riding terrain that may include chatter type bumps. As discussed above, in the bypass dampening zone 104, the grooves 110 provide less restriction to dampening fluid flow around the piston 124.

Figure 3:
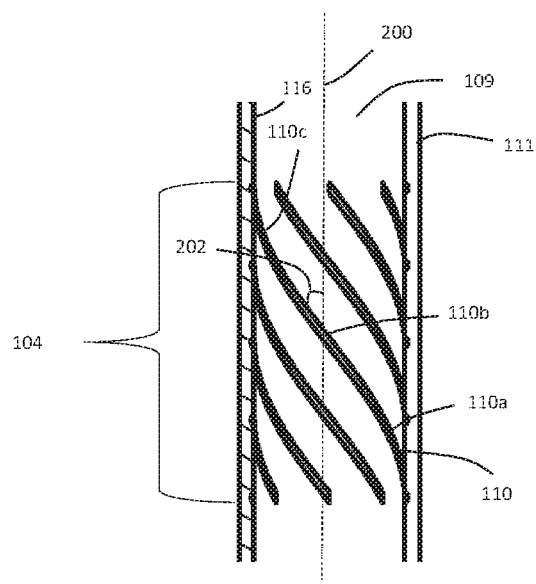
FIG. 3 illustrates a partial close up cross-sectional side view of an interior surface of a shock body having a plurality of grooves according to one exemplary embodiment.

FIG. 3 illustrates a close up view of grooves 110 in the cylindrical interior surface 116 of the inner chamber 109. In one embodiment, the grooves 110 are machined in the single walled interior surface 116. The grooves 110, in an embodiment, extend a desired length (which depends on the desired length of the associated zone) at a select angle 202 in relation to a central axis 200 of the inner chamber 109 to form a helix shape in the cylindrical interior surface 116 of the shock body 111. The helix shape of the grooves 110 rotate the piston band 115 that seals the piston 124 to the sidewall (interior surface 116) of the shock body 111. This rotation helps eliminate a point contact that would occur in the event the grooves were straight cut which would lead to excessive wear on the piston band 115. Further, the desired fluid flow around the piston 124 to achieve a desired characteristic of the shock absorber 100 can be accomplished by varying the grooves. In some embodiments the grooves are formed in a uniform manner. In other embodiments, progressive grooves are used to achieve a desired flow at different locations within a zone. For example, different locations, such as locations 110a, 110b and 110c may have different depths or thicknesses to achieve a desired progressive fluid flow in one direction in the zone and a regressive fluid flow in a second direction in the zone.

Figure 4A:
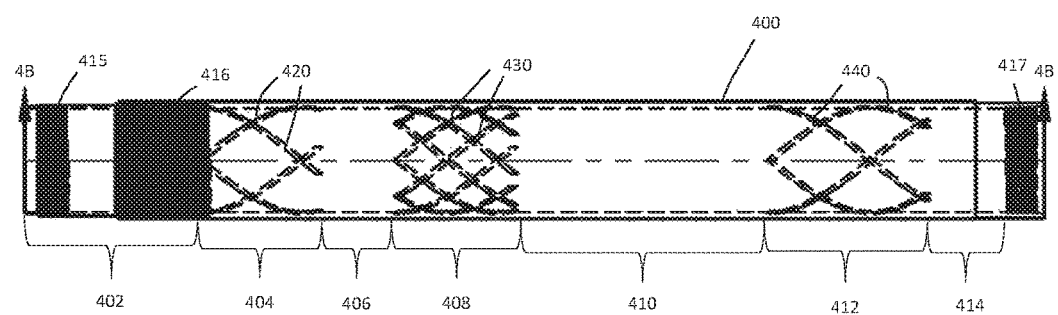
FIG. 4A illustrates a side view of a shock body with phantom lines indicating zones of grooves according to one exemplary embodiment.
Figure 4B:
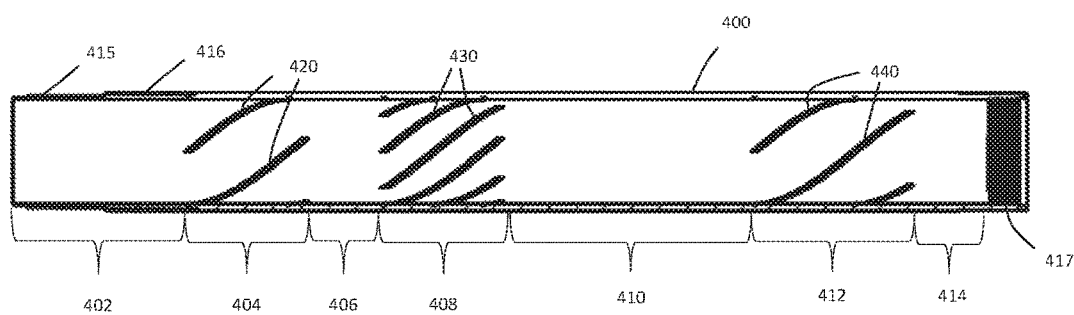
FIG. 4B is a cross-sectional side view of shock body along line 4B_4B of FIG. 4A.

Another example of a main shock body 400 with different zones is illustrated in FIG. 4A and FIG. 4B. FIG. 4A illustrates the main shock body 400 with phantom lines that indicate different grooves formed in different zones 404, 408 and 412. FIG. 4B illustrates a cross-sectional side view of the main shock body 400 along line 4B_4B of FIG. 4A. The main shock body 400 is illustrated as including external threads 415 and 416 and internal threads 417. This example embodiment includes zones 402, 404, 406, 408, 410, 412, 414. As discussed above, zones 404, 408 and 412 includes grooves 420, 430 and 440. As illustrated, another way of adjusting the dampening fluid flow is by changing the number of grooves used in the zone. For example, zone 404 has less grooves 420 than the number of grooves 440 in zone 412 (and hence provides less dampening fluid flow) and zone 408 has more grooves 430 than the number of grooves 440 in zone 412 (and hence provides more dampening fluid flow). Hence, adjusting the number of grooves in a given zone is another way of providing different characteristics for the shock absorber in different zones.

Although the zones 404, 408 and 412 with grooves 420, 430 and 440 are shown spaced from each other by zones 406 and 410, in another embodiment one or more zones with grooves are positioned directly adjacent each other. For example, zones 406 and 410 may be removed so zones 420, 430 and 440 are directly adjacent to each other. This embodiment may be helpful when it is desired to progressively transition from a more compliant zone, such as zone 408, to less compliant zones, such as zones 402 and 414. As discussed above the change in compliance (change in dampening of fluid flow) between zones can be achieved in a number of ways including, as illustrated in FIGS. 4A and 4B, varying the number of grooves between zones, changing the depth of the grooves between zones, changing the shape of the grooves between zones and changing the orientation of the grooves between zones. Further in an embodiment a zone or zones with grooves may extend an entire length of an inner chamber of a shock absorber. For example, zone 104 illustrated in FIG. 3 may extend the entire length of an inner chamber in which the piston 124 may move.

Figure 5A:
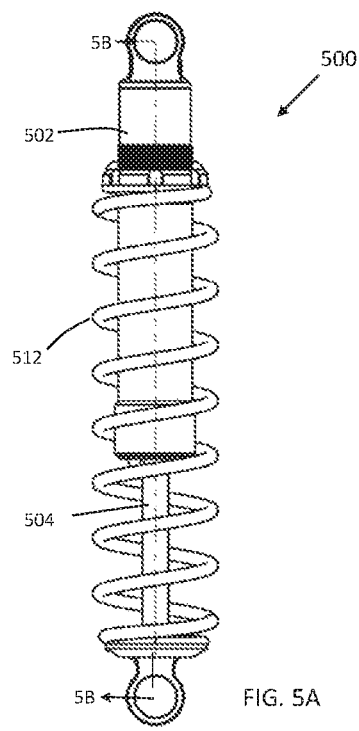
FIG. 5A is a side view of a monotube coil over shock absorber according to one exemplary embodiment.
Figure 5B:
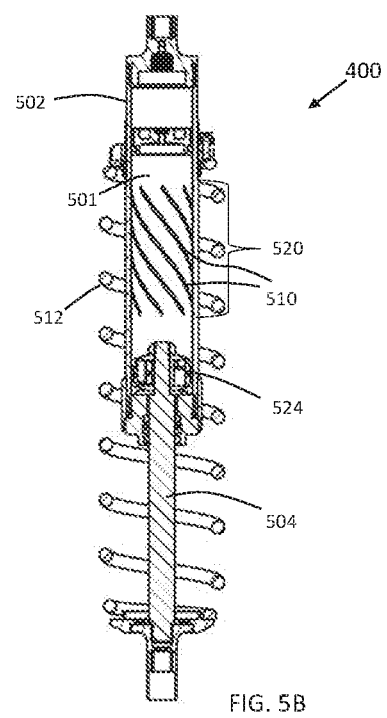
FIG. 5B is a cross-sectional side view of the shock absorber along line 5B_5B of FIG. 5A.

The use of grooves in embodiments are not limited to a specific type of shock absorber. For example, FIGS. 5A through 9B illustrate additional examples of different types of shock absorbers that may implement zones with grooves. In particular, FIGS. 5A and 5B illustrate a shock absorber 500 that includes a main shock body 502, a main shaft 504 of a shaft assembly and coil spring 512. Shock absorber 500 is monotube coilover shock absorber. The shock absorber 500 is illustrated in a full stroke extension. The main shaft body 502 includes a main chamber 501 in which the piston 524 of the shaft assembly is received. This embodiment includes a zone 520 with grooves 510. This embodiment of the shock absorber 500 does not include a reservoir assembly.

Figure 6A:
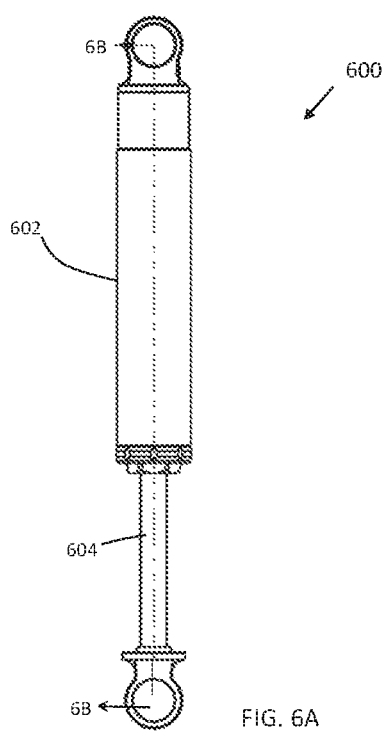
FIG. 6A is a side view of a monotube non-coilover shock absorber according to one exemplary embodiment.
Figure 6B:
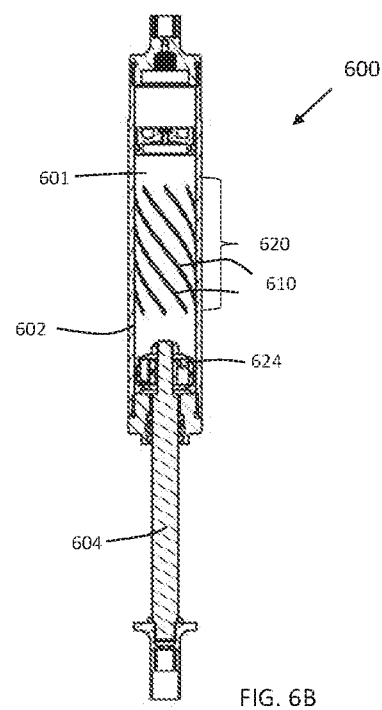
FIG. 6B is a cross-sectional side view of the shock absorber along line 6B_6B of FIG. 6A.

FIGS. 6A and 6B illustrate another shock absorber 600 that includes a main shock body 602, a main shaft 604 of a shaft assembly. The shock absorber 600 is monotube non-coilover shock absorber. Shock absorber 600 is illustrated in a full stroke extension. The main shaft body 602 includes a main chamber 601 in which the piston 624 of the shaft assembly is received. This embodiment includes a zone 620 with grooves 610. This embodiment of the shock absorber 600 does not include a coil spring nor a reservoir.

Figure 7A:
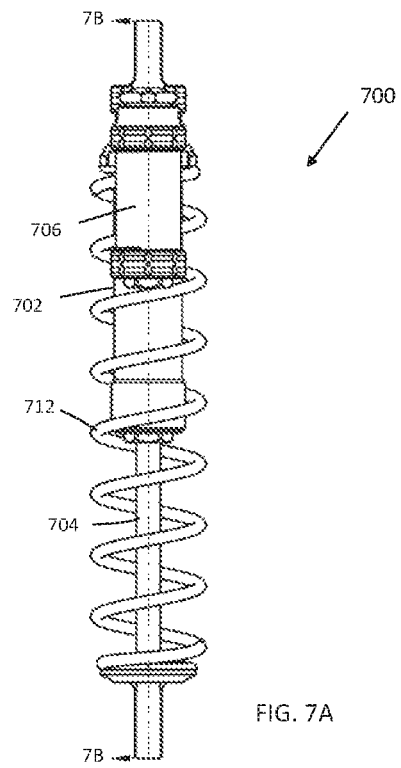
FIG. 7A is a side view of a non-rebound, reservoir, coilover shock absorber according to one exemplary embodiment.
Figure 7B:
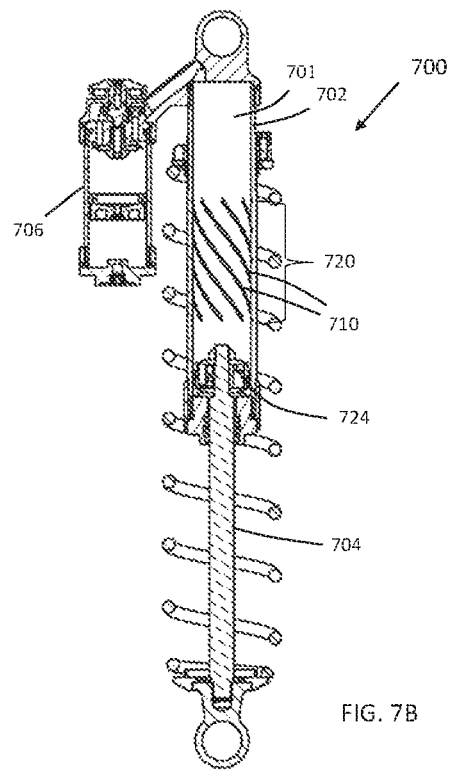
FIG. 7B is a cross-sectional side view of the shock absorber along line 7B_7B of FIG. 7A.

FIGS. 7A and 7B illustrate another shock absorber 700 that includes a main shock body 702, a reservoir assembly 706 and a main shaft 704 of a shaft assembly. The shock absorber 700 is a non-rebound, reservoir, coilover shock absorber. Shock absorber 700 is illustrated in a full stroke extension. The main shaft body 702 includes a main chamber 701 in which a piston 724 of the shaft assembly is received. This embodiment includes a zone 720 with grooves 710. This embodiment of the shock absorber 700 includes a coil spring 712 and a reservoir assembly 706.

Figure 8A:
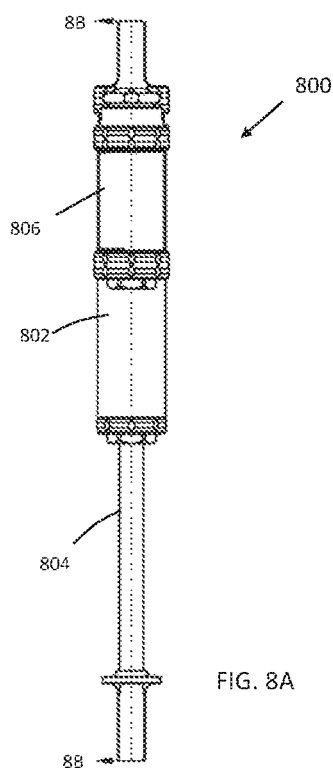
FIG. 8A is a side view of a non-rebound, reservoir, non-coilover shock absorber according to one exemplary embodiment.
Figure 8B:
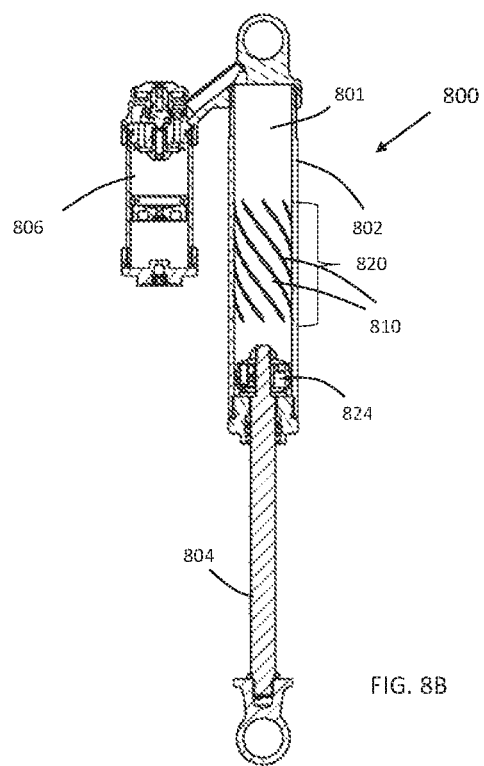
FIG. 8B is a cross-sectional side view of the shock absorber along line 8B_8B of FIG. 8A.

FIGS. 8A and 8B illustrate another shock absorber 800 that includes a main shock body 802, a reservoir assembly 806 and a main shaft 804 of a shaft assembly. The shock absorber 800 is a non-rebound, reservoir, non-coilover shock absorber. Shock absorber 800 is illustrated in a full stroke extension. The main shaft body 802 includes a main chamber 801 in which a piston 824 of the shaft assembly is received. This embodiment includes a zone 820 with grooves 810.

FIGS. 9A and 9B illustrate another shock absorber 900 that includes a main shock body 902, a reservoir assembly 906 and a main shaft 904 of a shaft assembly. The shock absorber 900 is a rebound adjust, reservoir, non-coilover shock absorber. Shock absorber 900 is also illustrated in a full stroke extension. The main shaft body 902 includes a main chamber 901 in which a piston 924 of the shaft assembly is received. This embodiment includes a zone 920 with grooves 910.

Figure 10:
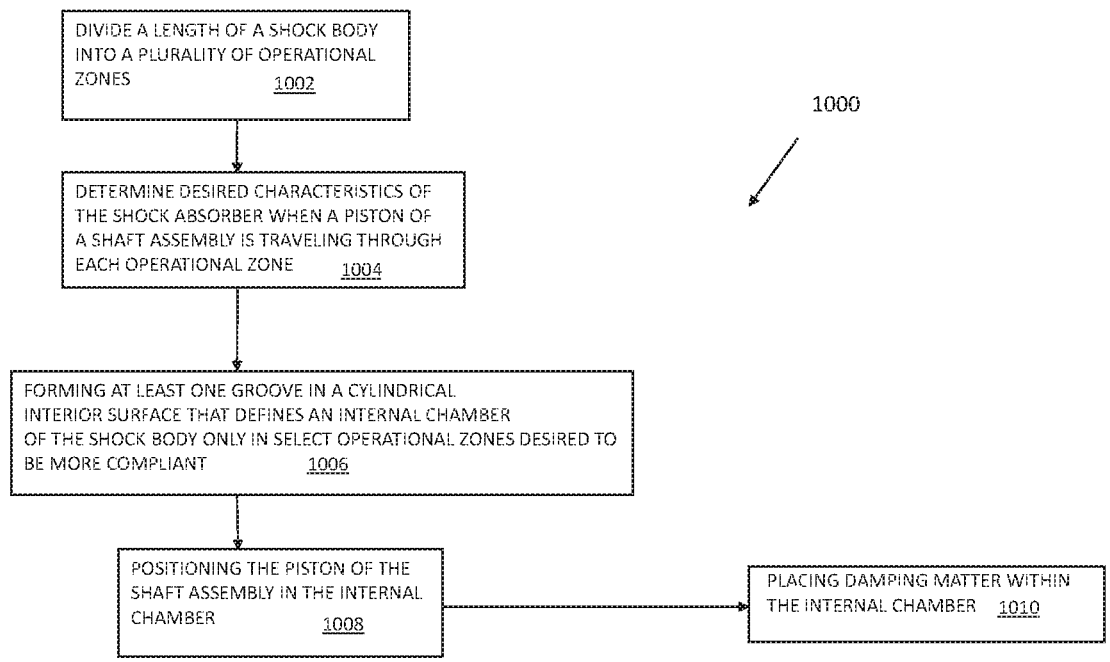
FIG. 10 is a shock adjuster formation flow diagram according to one exemplary embodiment.

Referring to FIG. 10 an example shock adjuster formation flow diagram 100 of one exemplary embodiment is illustrated. The shock adjuster formation flow diagram 100 is provided in a series of sequential blocks. The sequence may be different in different embodiments. Moreover embodiments may include less or more blocks. Hence, embodiments are not limited to the specific sequence of blocks or the same blocks as illustrated in FIG. 10.

In the example of FIG. 10, the length of a shock body is divided up into a plurality of operational zones at block (1002). It is determined at block (1004) what the desired characteristics of the shock absorber is when a piston of a shaft assembly is traveling through each operational zone. At least one groove is formed in operational zones that are desired to be more compliant at block (1006). In one example embodiment, the forming of grooves is done with a machining process. The amount of grooves used, the depth of the grooves, the orientation of the grooves, the shapes of the grooves in the cylindrical interior surface of the internal chamber may be adjusted to achieve the desired characteristic of the operational zone by regulating the amount of dampening matter bypass. Once the operational zones are conformed to achieve the desired characteristic, the piston of the shaft assembly is positioned within the internal chamber at block (1008) and the dampening matter, such as dampening fluid is also placed in the internal chamber at block (1010).

Example Embodiments

Example 1 includes a shock absorber. The shock absorber includes a shock body and a shaft assembly. The shock body has an inner chamber. The inner chamber is defined by a cylindrical interior surface of the shock body. At least one groove is formed in the interior surface of the shock body within at least one select length of the shock body. A piston of the shaft assembly is received within the inner chamber of the shock body. The piston includes valving to allow dampening matter that is received within the inner chamber to pass through the piston to allow the piston to move within the inner chamber of the shock body. The at least one groove that is formed within the interior surface is configured to allow at least some of the dampening matter to bypass the valving of the piston allowing the piston is move through the at least one select length of the main shock body including the at least one groove with less resistance with less resistance than is encountered with the dampening matter only flowing through the valving.

Example 2, includes the shock absorber of Example 1, wherein the at least one groove forms a helix shape within the interior surface of the inner chamber of the shock body.

Example 3 includes the shock absorber of any of the Examples 1-2, wherein the at least one groove includes a plurality of spaced grooves that are formed within the at least one select length of the shock body.

Example 4 includes the shock absorber of any of the Examples 1-3, wherein a total length of the main shock body is defined by a plurality of different operational zones, the at least one select length containing the at least one groove forming at least one operational zone of the plurality of operational zones, further wherein at least one other operational zone of the plurality of operational zones does not have a groove.

Example 5 includes the shock absorber of any of the Examples 1-4, wherein the at least one groove within the at least one select length of the shock body is positioned so the piston of the shaft assembly is located within the at least one select length during normal ride conditions.

Example 6 includes the shock absorber of any of the Examples 1-5, further including a piston band coupled to the piston of the shaft assembly. The piston band configured to seal the piston to the interior surface of the shock body when the piston is not located within the at least one select length having the at least one groove. The at least one groove configured to rotate the piston band when the piston is moving through the at least one select length having the at least one groove.

Example 7 includes the shock absorber of any of the Examples 1-6, wherein the at least one groove is a progressive groove.

Example 8 includes the shock absorber of Example 7, wherein the progressive groove varies in at least one of depth, shape and width along a length of the progressive groove to achieve a desired characteristic of the shock absorber.

Example 9 includes the shock absorber of any of the Examples 1-8, further comprising at least one of a coil spring operationally coupled between the shock body and the shaft assembly and a reservoir assembly in fluid communication with the inner chamber of the shock body.

Example 10 includes the shock absorber of any of the Examples 1-9, wherein the dampening matter is one of a fluid and a gas.

Example 11 includes the shock absorber of any of the Examples 1-10, wherein the valving includes an anti-pack valve.

Example 12 includes a shock absorber including a shock body and a shaft assembly. The shock body has an internal chamber. The internal chamber is defined by a cylindrical interior surface. The shock body includes a plurality of operational zones. Each operational zone covers a select length of the interior surface of the shock body. At least one operational zone of the plurality of operational zones has a plurality of grooves formed in the interior surface of the shock body. At least one other operational zone of the plurality of operational zones does not have a groove formed in the interior surface of the shock body. The shaft assembly includes a piston. The piston is received within the internal chamber of the shock body. The piston includes valving that allows dampening matter that is received within the internal chamber to pass through the piston to allow the piston to move within the internal chamber. The plurality of grooves in the at least one operational zone allows the dampening matter to at least in part bypass the valving of the piston as the piston of the shaft assembly passes through the at least one operational zone with the plurality of grooves.

Example 13 includes the shock absorber of Examples 12, wherein at least one of the plurality of grooves is a progressive groove.

Example 14 includes the shock absorber of any of the Examples 12-13, wherein the plurality of operational zones includes at least a top out zone, a bottom out zone and a bypass dampening zone, the bypass dampening zone including the plurality of grooves.

Example 15 includes the shock absorber of any of the Examples 12-14, wherein the plurality of grooves in the interior surface of the at least one operational zone of the plurality of operational zones are in a helix shape.

Example 14 includes the shock absorber of Example 15, further including a piston band coupled to the piston of the shaft assembly. The piston band configured to seal the piston to the interior surface of the shock body when the piston is not located within the at least one operational zone having the plurality of grooves. The plurality of grooves are configured to rotate the piston band when the piston is moving through the operational zone having the plurality of grooves.

Example 17 includes a method of forming a shock absorber. The method includes; dividing a length of a shock body into a plurality of operational zones; forming a plurality of grooves in a cylindrical interior surface that defines an internal chamber of the shock body in one of the operational zones; positioning a piston including shaft assembly within the internal chamber, the piston including valving; and placing dampening matter within the internal chamber, placing dampening matter within the internal chamber, wherein movement of the piston within the internal chamber within a zone without the at least one groove is provided by the dampening matter passing only through the valving in the piston while movement of the piston within the internal chamber through the operational zone with the at least one groove is provided by at least some of the dampening matter bypassing the valving in the piston through the at least one groove.

Example 18 includes the method of example 17, wherein the operational zones includes at least a bypass dampening zone that includes the plurality of grooves, a top out zone without grooves and a bottom out zone without grooves.

Example 19 includes the method of any of the Examples 17-18, further including; achieving a desired characteristic of the shock absorber when the piston is moving through the operational zone with the plurality of grooves by one of, selecting the number of grooves to use, selecting the shape of one or more grooves to use, selecting the orientation of the grooves and selecting the depth of one of more of the grooves to use.

Example 20 includes the method of any of the Examples 17-19, further including forming at least one of the grooves of the plurality of grooves in a helix shape within the cylindrical interior surface that defines the internal chamber of the shock body.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A shock absorber comprising:
a shock body of a mono tube shock absorber having an inner chamber, the inner chamber defined by a cylindrical interior surface of the shock body, at least one groove formed in the interior surface of the shock body within at least one select length of the shock body, wherein the at least one groove forms a helix shape within the interior surface of the inner chamber of the shock body; and
a piston of a shaft assembly received within the inner chamber of the shock body, the piston including valving to allow dampening matter that is received within the inner chamber to pass through the piston to allow the piston to move within the inner chamber of the shock body, the at least one groove formed within the interior surface being configured to allow at least some of the dampening matter to bypass the valving of the piston to allow the piston to move along the at least one select length of the shock body including the at least one groove with less resistance than is encountered with the dampening matter only flowing through the valving.

2. The shock absorber of claim 1, wherein the at least one groove is formed in a main ride zone in the interior surface of the shock body, the main ride zone positioned between a top out zone and a bottom out zone in the interior surface of the shock body, at least one of the top out zone and the bottom out zone not including a groove.

3. The shock absorber of claim 1, wherein the at least one groove includes a plurality of spaced grooves that are formed within the at least one select length of the shock body.

4. The shock absorber of claim 1, wherein a total length of the shock body is defined by a plurality of different operational zones, the at least one select length containing the at least one groove forming at least one operational zone of the plurality of operational zones, further wherein at least one other operational zone of the plurality of operational zones does not have a groove.

5. The shock absorber of claim 1, wherein the at least one groove within the at least one select length of the shock body is positioned so the piston of the shaft assembly is located within the at least one select length during normal ride conditions.

6. The shock absorber of claim 1, further comprising:
a piston band coupled to the piston of the shaft assembly, the piston band configured to seal the piston to the interior surface of the shock body when the piston is not located within the at least one select length having the at least one groove, the at least one groove configured to rotate the piston band when the piston is moving through the at least one select length having the at least one groove.

7. The shock absorber of claim 1, wherein the at least one groove is a progressive groove.

8. The shock absorber of claim 7, wherein the progressive groove varies in at least one of depth, shape and width along a length of the progressive groove to achieve a desired progressive characteristic.

9. The shock absorber of claim 1, further comprising at least one of a coil spring operationally coupled between the shock body and the shaft assembly and a reservoir assembly in fluid communication with the inner chamber of the shock body.

10. The shock absorber of claim 1, wherein the dampening matter is one of a fluid and a gas.

11. The shock absorber of claim 1, wherein the valving includes a compression valve stack and a rebound valve stack.

12. A shock absorber comprising:
a shock body of a mono tube shock absorber having an internal chamber, the internal chamber defined by a cylindrical interior surface, the shock body including a plurality of operational zones, each operational zone covering a select length of the interior surface of the shock body, at least one operational zone of the plurality of operational zones having a plurality of grooves formed in the interior surface of the shock body, at least one other operational zone of the plurality of operational zones not having a groove formed in the interior surface of the shock body; and
a shaft assembly including a piston, the piston received within the internal chamber of the shock body, the piston including valving that allows dampening matter that is received within the internal chamber to pass through the piston to allow the piston to move within the internal chamber, the plurality of grooves in the at least one operational zone allowing the dampening matter to at least in part bypass the valving of the piston as the piston of the shaft assembly passes through the at least one operational zone with the plurality of grooves.

13. The shock absorber of claim 12, wherein at least one of the plurality of grooves is a progressive groove.

14. The shock absorber of claim 12, wherein the plurality of operational zones includes at least a top out zone, a bottom out zone and a bypass dampening zone, the bypass dampening zone including the plurality of grooves.

15. The shock absorber of claim 12, wherein the plurality of grooves in the interior surface of the at least one operational zone of the plurality of operational zones are in a helix shape.

16. The shock absorber of claim 15, further comprising:
a piston band coupled to the piston of the shaft assembly, the piston band configured to seal the piston to the interior surface of the shock body when the piston is not located within the at least one operational zone having the plurality of grooves, the plurality of grooves configured to eliminate a single point contact with the piston band when the piston is moving through the operational zone having the plurality of grooves.

17. A method of forming a shock absorber, the method comprising:
dividing a length of a single wall shock body of a mono tube shock absorber into a plurality of operational zones;
forming at least one groove in a cylindrical interior surface that defines an internal chamber of the shock body in one of the operational zones;
positioning a piston including shaft assembly within the internal chamber, the piston including valving; and
placing dampening matter within the internal chamber, wherein movement of the piston within the internal chamber within a zone without the at least one groove is provided by the dampening matter passing only through the valving in the piston while movement of the piston within the internal chamber through the operational zone with the at least one groove is provided by at least some of the dampening matter bypassing the valving in the piston through the at least one groove.

18. The method of claim 17, wherein the operational zones includes at least a bypass dampening zone that includes the plurality of grooves, a top out zone without grooves and a bottom out zone without grooves.

19. The method of claim 17, further comprising:
achieving a desired characteristic of the shock absorber when the piston is moving through the operational zone with the plurality of grooves by one of,
selecting a number of grooves to use,
selecting a shape of one or more grooves to use,
selecting a orientation of one or more grooves to use, and
selecting a depth of one of more grooves to use.

20. The method of claim 17, further comprising:
forming at least one of the grooves of the plurality of grooves in a helix shape within the cylindrical interior surface that defines the internal chamber of the shock body.

* * * * *